Figure 1:
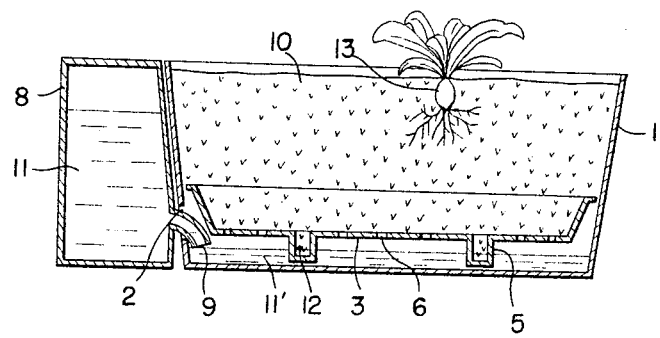

Sept. 13, 1966  SAKAE MORI  3,271,900
AUTOMATIC PURE CULTIVATOR

Filed Dec. 24, 1963  2 Sheets—Sheet 1

INVENTOR
SAKAE MORI
BY
Linton and Linton
ATTORNEYS

Sept. 13, 1966  SAKAE MORI  3,271,900
AUTOMATIC PURE CULTIVATOR
Filed Dec. 24, 1963  2 Sheets-Sheet 2

INVENTOR
SAKAE MORI
BY
Linton and Linton
ATTORNEYS

United States Patent Office 3,271,900
Patented Sept. 13, 1966

3,271,900
AUTOMATIC PURE CULTIVATOR
Sakae Mori, 604, 5-chome, Setagaya-ku, Tokyo, Japan
Filed Dec. 24, 1963, Ser. No. 333,139
Claims priority, application Japan, Mar. 12, 1963,
38/16,191
1 Claim. (Cl. 47—38.1)

The present invention is concerned with self-feeding plant holders.

As a means of cultivating farm products without using soil there are available water cultivation methods, sand cultivation methods, pebble cultivation methods, and the like. From among these methods, the water cultivation method has been experimentally employed but is of almost no practical use for cultivation for the reason that the root of a plant enters into a culture solution, water, in the case of the water cultivation of bulbs, and therefore the respiratory activity of the root is hampered thereby making its normal growth difficult to be achieved. In the cases of the sand cultivation and the pebble cultivation, it is necessary to irrigate and drain the culture solution intermittently into the sand layer or the pebble layer in order to achieve normal growth without hampering the respiratory activity of the plant root. To utilize the sand cultivation or the pebble cultivation in the practical cultivation of farm products for the purpose of achieving normal growth, these methods would necessitate irrigating and draining the culture solution several times a day either manually or by mechanical power thereby requiring constant personal care or installing considerable mechanical equipment for that purpose.

Apart from these methods there is also a way of feeding a culture solution slowly from a culture-solution tank into the soil or sand or the like in cultivation pots by utilizing the capillary nature of natural or artificial fibers, but this has drawbacks due to the differences in activity and efficacy, subject to the manner of use, of fibers, the properties of the soil or sand or the like, in addition to the necessity of frequent attention to be paid to the feeding of the culture solution in the tank.

Accordingly, satisfactory results can not be expected from any one of the aforementioned methods without having a certain amount of special, technical knowledge on the cultivation of farm products.

The present plant holder is used by placing special cultivating soil, hereinafter referred to as "special soil," into the inner box of a plant container as a substitute for soil or sand or the like, inserting a part of the lower portion thereof into the culture solution which is maintained at a fixed level, and properly feeding the culture solution all over said special soil utilizing the limited capillarity of the special soil itself while also providing an aeration from the lower portion of the special soil layer to the mid-layer of the same through small holes or slits of the inner box. By so doing the root of a plant seeded or planted in this special soil will spread sufficiently up to only several centimeters above the culture solution and the plant will automatically grow in a pure condition.

The principal object of the present invention is to provide means for cultivating vegetables, flowers and the like automatically and without any special technical care of the plants with regard to supplying fertilizer, water and the like and which employs a structure which is economical to produce and assemble, can be readily disassembled for cleaning or the like and can be used in small areas such as verandas and houses which do not have gardens, apartment houses and the like.

Figure 2:
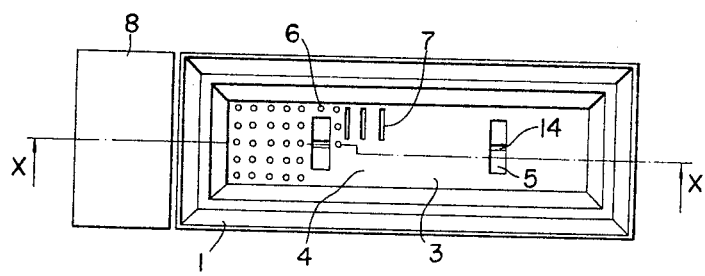
Figure 3:
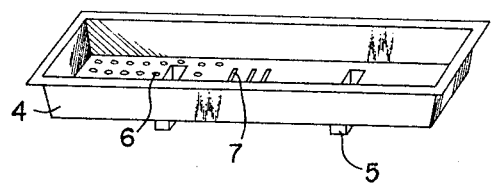
Figure 4:
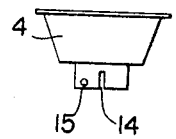
Figure 5:
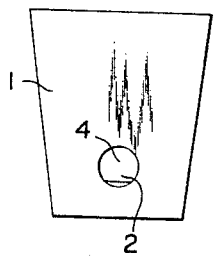
Figure 6:
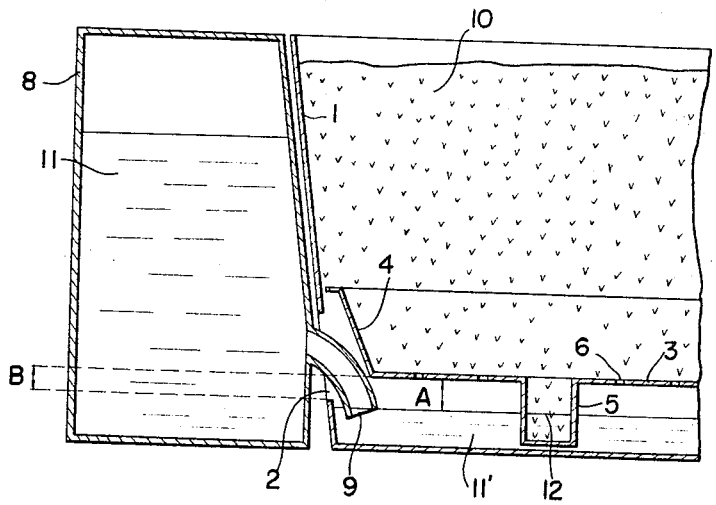

Further objects of the present invention will be in part pointed out and in part obvious in the following description of the accompanying drawings in which;

FIG. 1 is a vertical-sectional view taken on line x—x of FIG. 2.
FIG. 2 is a plan view of the present invention.
FIG. 3 is a perspective view of the inner box.
FIG. 4 is an end view of the inner box.
FIG. 5 is an end view of the container at the side thereof to which the tank is attached; and
FIG. 6 is an enlarged vertical sectional view of a portion of the invention showing the relationship of the culture solution and the air intake with the inner box of the invention.

Referring now more particularly to the accompanying drawings wherein like and corresponding parts are designated by similar reference characters, 1 indicates a closed box shaped plant container without any opening except the feeding portion 2 for the culture solution and air hereinafter called "air intake." An inner box 3 has small bottom holes 6, side walls 4 and is provided with hollow legs 5, whose cross-sectional shape is properly fixed and have small side slits 7. The lower end of the air intake 2 is located lower than the bottom of the inner box 3; that is to say, as shown in FIG. 6, there is a horizontal difference such as B between the bottom of the inner box 3 and the lower end of the air intake 2. An end portion of a nozzle 9 of a culture-solution tank 8 having the nozzle 9 alone for maintaining the water level of the culture solution 11, is inserted into the inside of the container 1 through the said air intake 2.

10 is special soil, 11 is a culture solution, 12 is the contact surface of the culture solution 11 with the special soil 10, and 13 is a vegetable plant such as corn.

Next the manner of using the cultivator of the present invention will be described: After the inner box 3 is inserted into the lower inside portion of the said container 1, special soil 10 is put in and filled full to nearly the upper brim of the container 11.

The special soil 10 is a homogeneous mixture of large porous grains, pebbles of the similar size may be substituted therefor, for example roasted pearlite, small grains of the same, and washed sand, mixed at the ratio of 2:1:1.

The culture solution tank 8 is inverted upside down after a certain fixed amount of the stock solution of the culture liquid already prepared is poured from its nozzle 9, water is then poured in to fill up the culture-solution tank; then, holding a finger or the like over the nozzle 9 while also placing the culture-solution tank 8 back into its normal state, the drain opening 9 is quickly inserted downward into the inside of said container through its air intake port 2.

In the case, where the inner diameter of the nozzle 9 is fixed, for example, 1.5 cm. or so, air goes into the culture solution tank 8 along the inside of the drain opening 9 no faster than the culture solution 11 flows into the bottom of the container 1, and its flow stops when the level of the culture solution 11 reaches the nozzle 9.

In this way, as the culture solution 11 flows into the bottom of the container 1, it permeates the special soil 10 which has filled the inside of the inner box 3, through the small holes 15 of about 2–3 mm. across or the slits 14 of about 2 mm. wide in the legs 5 of the inner box 3, and then it is slowly drawn up into the entire layer of the special soil 10 by its capillarity.

Thereafter, the decrease of the culture solution 11 at the bottom of the container 1 caused by the absorption of the plants or aqueous evaporation or the like is automatically replaced by the same action as aforementioned.

By providing the inner box 3, aeration to the entire layer of the special soil can be achieved in cooperation with aeratability of the special soil 10 since it is so devised that the inner box 3 has small holes 6 or slits 7 all over its bottom and there is a space A of, e.g., about 1 cm. between the lower surface of the inner box 3 and the surface of the culture solution 11 that is maintained at a certain fixed level.

Furthermore, the sides 4 around the inner box 3 are intended to reinforce the inner box 3 as well as to prevent the cultivating soil 10 from spilling out by covering the portion of the air intake 2 from within.

The shape of each of the legs 5 of the inner box 3 is cylindrical or square-piped, and the size herein of the legs 5, that is, the total area of contact of the special soil 10 therein with the surface of the culture solution 11 at the bottom of the cultivator 1 is based upon the experimental results, and in case the special soil 10 is in contact with the surface of the culture solution 11 in excess thereof, the culture liquid contained in the cultivating soil 10 will become excessive to the plants seeded or planted.

Moreover, it is not only for attaining aeration of the whole of the lower surface of the special soil 10 and also for removing excessive water out of the container 1 before said water reaches over the bottom of the inner box 3 as when an excess of water due to rain and the like enters said container that some horizontal difference B has been provided between the lower end of the air intake 2 and the bottom face of the inner box 3, as by so arranging the elements of the present invention it is possible to prevent overmoisture and underaeration of the special soil 10.

The present invention is capable of considerable modifications, and such changes thereto as come within the scope of the appended claim are deemed to be a part thereof.

What I claim is:

A self-feeding plant holder comprising an open top plant container having a bottom and sides with a side opening, an inner open top box having a bottom with openings, outwardly slanting sides, and hollow legs extending from said box bottom and having side openings, said box being detachably positioned in said container with said legs mounted on said container bottom spacing said box bottom from said container bottom and with said box sides extending to said container sides, a special soil positioned in said box and thereabove in said container towards the open top of said container, a closed solution tank having a laterally extending curved tubular nozzle detachably extending through said container side opening and spaced from said container for allowing air to enter said container beneath said box and said nozzle having an open end positioned on a level beneath said box bottom.

References Cited by the Examiner
UNITED STATES PATENTS

| | | | |
|---|---|---|---|
| 2,089,220 | 8/1937 | Norman | 47—38.1 |
| 2,499,885 | 3/1950 | Sommer | 47—38.1 |
| 2,803,091 | 8/1957 | Radford | 47—38 |

ANTONIO F. GUIDA, *Acting Primary Examiner.*

A. G. STONE, *Examiner.*

R. E. BAGWILL, *Assistant Examiner.*